United States Patent
Overbergh et al.

(10) Patent No.: US 7,731,128 B2
(45) Date of Patent: Jun. 8, 2010

(54) MOBILE LEADING EDGE FLAP FOR A MAIN WING OF THE AEROFOILS OF AN AIRCRAFT AND MAIN WING PROVIDED WITH SUCH A FLAP

(75) Inventors: Christian Overbergh, Ciney (BE); Michel Hautecoeur, Ceroux-Mousty (BE)

(73) Assignee: Sonaca S.A., Gosselies (BE)

( * ) Notice: Subject to any disclaimer, the term of this patent is extended or adjusted under 35 U.S.C. 154(b) by 923 days.

(21) Appl. No.: 10/597,316

(22) PCT Filed: Jan. 20, 2005

(86) PCT No.: PCT/EP2005/050226

§ 371 (c)(1),
(2), (4) Date: Jul. 27, 2006

(87) PCT Pub. No.: WO2005/070762

PCT Pub. Date: Aug. 4, 2005

(65) Prior Publication Data

US 2008/0237401 A1 Oct. 2, 2008

(30) Foreign Application Priority Data

Jan. 22, 2004 (BE) .................................. 2004/0037

(51) Int. Cl.
*B64C 3/50* (2006.01)
(52) U.S. Cl. ..................... 244/214; 244/121; 244/123.1; 244/123.2; 244/213; 244/129; 244/132

(58) Field of Classification Search ................. 244/121, 244/123.1, 123.2, 129, 132, 213, 214
See application file for complete search history.

(56) References Cited

U.S. PATENT DOCUMENTS

| 1,781,160 | A | * | 11/1930 | Carns | .................... 244/123.14 |
| 1,956,823 | A | * | 5/1934 | Carns | ...................... 244/123.4 |
| 2,324,303 | A | * | 7/1943 | Johnson | .................. 244/134 C |
| 4,671,471 | A | * | 6/1987 | Patmont | .................. 244/123.5 |
| 5,484,221 | A | * | 1/1996 | DeCoux | ..................... 403/203 |

(Continued)

FOREIGN PATENT DOCUMENTS

EP 0 361 286 A2 4/1990
JP 2003-291892 10/2003

*Primary Examiner*—Timothy D Collins
*Assistant Examiner*—Justin Benedik
(74) *Attorney, Agent, or Firm*—Pearne & Gordon LLP

(57) ABSTRACT

The invention relates to a leading edge mobile flap (16) for a main wing of an aircraft, this flap including an aerodynamic skin (18) that has a bird impact-sensitive frontal area (24), and a rear skin (28) integral with the aerodynamic skin (18), the flap also comprising a plurality of ribs (34) spaced out along a leading edge longitudinal direction (X'). According to the invention, the flap additionally includes, between two directly consecutive ribs, a single rigid bird trajectory-deflecting wall (42) anchored to the skins (18, 28). Furthermore, in a cross-section taken along any plane orthogonal to the direction (X'), the wall (42) forms with a geometric chord (26) of the flap an angle ($\alpha_1$) with a value of less than 45°.

8 Claims, 2 Drawing Sheets

U.S. PATENT DOCUMENTS

| | | | | |
|---|---|---|---|---|
| 5,590,854 | A | * | 1/1997 | Shatz .......................... 244/206 |
| 5,806,808 | A | * | 9/1998 | O'Neil ........................ 244/213 |
| 6,135,395 | A | * | 10/2000 | Collett ........................ 244/209 |
| 6,607,168 | B1 | * | 8/2003 | Cordier et al. ............ 244/199.1 |
| 6,616,101 | B2 | * | 9/2003 | De Castro Nodal et al. ........................ 244/123.3 |
| 6,622,973 | B2 | * | 9/2003 | Al-Garni et al. ............ 244/206 |
| 6,655,633 | B1 | * | 12/2003 | Chapman, Jr. ............ 244/123.9 |

* cited by examiner

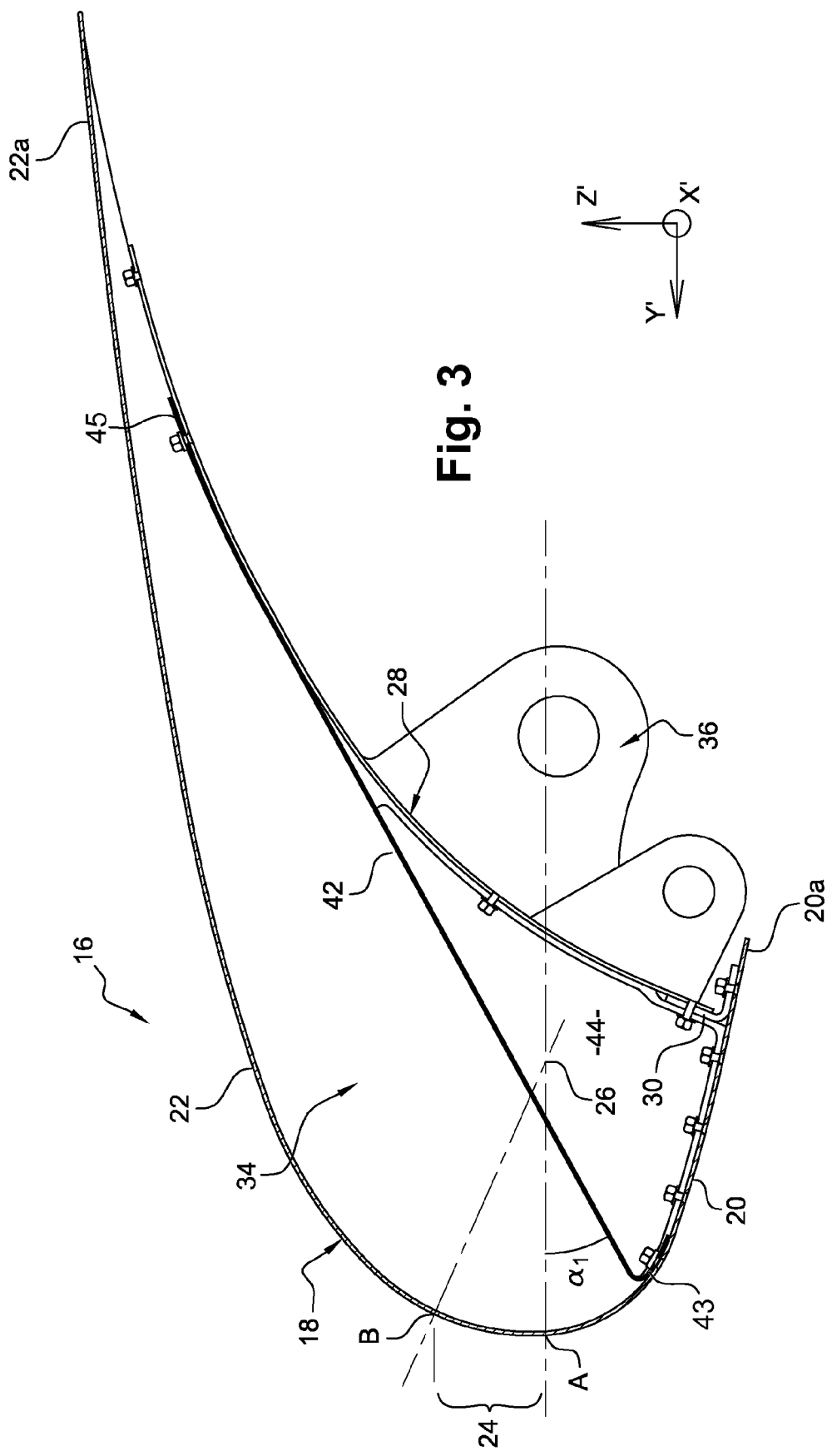

MOBILE LEADING EDGE FLAP FOR A MAIN WING OF THE AEROFOILS OF AN AIRCRAFT AND MAIN WING PROVIDED WITH SUCH A FLAP

TECHNICAL FIELD

The present invention relates in a general way to a leading edge mobile flap for a main wing of the wing system of an aircraft, this mobile flap including in particular an aerodynamic skin that has a front area sensitive to bird impacts. This type of mobile flap is designed so as to limit the damage it might sustain subsequent to the impact of a bird in cruise flight, on the ground during aircraft maneuvering operations, or during the takeoff and landing phases.

This mobile flap is intended to constitute all or part of the leading edge of the main wing, although the solution specifying the provision of several mobile flaps on one and the same main wing is selected in preference.

Thus, the invention also relates to a main wing of an aircraft wing system that has at least one such leading edge.

PRIOR ART

On aircraft, each of the two main wings of the wing system is generally fitted with high-lift mobile flaps, mounted on the leading edge and the trailing edge of the wing.

In a known way, the flaps are deployed in respect of the landing and takeoff phases to increase lift at low or medium speed. Furthermore, in high-speed cruise flight, the mobile flaps are retracted to limit resistance to the forward movement of the aircraft. Moreover, and again in a way known to the man skilled in the art, each flap is displaced using mechanisms housed in the front part of a central main portion of the wing, these mechanisms engaging with load-introducing ribs of the flap spaced out along a leading edge longitudinal direction, and being in particular dimensioned so as to keep the flap in position during the different flight phases, and to ensure the transmission of aerodynamic loads.

A leading edge mobile flap of this kind must be designed in such a way as to be able to resist a bird impacting thereon in cruise flight, on the ground during aircraft maneuvering operations, or during the takeoff and landing phases. In other words, the flap must be sufficiently resistant for any deterioration thereof, caused during this type of impact, to have only minimal and non-disastrous consequences for the wing concerned.

In this respect, it is pointed out that a bird impacting on the leading edge mobile flap is particularly harmful and dangerous when this bird strikes a part of the aerodynamic skin of the flap known as the "bird impact-sensitive frontal area", this sensitive area corresponding to the most critical area of this aerodynamic skin, in the event of a bird impacting thereon. This area of the aerodynamic skin, at a relatively small angle relative to the vertical and extending in a limited way upwards and possibly downwards from a junction between an upper surface portion and a lower surface portion of the aerodynamic skin, is in fact called sensitive in so far as, when it is impacted by a bird, the shock generates very substantial energy which is mainly transmitted to the flap. Clearly, this energy would be capable of causing considerable deterioration of the flap if the latter was not designed to be sufficiently resistant, and could also have disastrous consequences for the wing of the aircraft. By way of example, it is noted that a bird impacting above and below the frontal area previously mentioned, will generate weaker energy, unlikely to produce destructive effects. Indeed, a bird coming into contact with one of the upper surface and lower surface portions, outside the frontal area, will have its trajectory deflected by the portion concerned, and the dynamic loads relating to the impact and transmitted to the mobile flap will then have no disastrous consequences.

In the light of what has been said above, it is obvious that the above-mentioned constraints inevitably lead to mobile flaps being designed that are of complex design, in the sense that the effective space for absorbing bird impacts is necessarily limited, in particular by the presence of a frost protection device. Moreover, it is noted that the structure provided to confront the energy of an impact, which is proportionate to the square of the speed of the aircraft, must be even more resistant when the aerodynamic skin is made out of a material that is not very ductile, such as a composite material. Indeed, although this type of material is often selected for obvious reasons associated with its light weight, it plays almost no part in absorbing the impact energy. Additionally, it is also pointed out that when the mobile flap is made entirely out of composite material, its brittleness on impact may easily lead to its being completely destroyed.

Consequently, in prior art embodiments, leading edge mobile flaps therefore have structures that are designed to restrict the destructive effects likely to be caused by a bird impacting in the frontal area of the aerodynamic skin, but for which the required specification leads to structural complexity which generates not inconsiderable drawbacks in terms of the cost and overall weight of the flap.

OBJECT OF THE INVENTION

The purpose of the invention is therefore to propose a leading edge mobile flap for a main wing of the wing system of an aircraft that includes in particular an aerodynamic skin that has a bird impact-sensitive frontal area, this mobile flap overcoming at least partially the drawbacks mentioned above in relation to prior art embodiments.

The purpose of the present invention is also to present a main wing of the wing system of an aircraft that includes at least one such leading edge mobile flap.

To do this, the object of the invention is a leading edge mobile flap for a main wing of the wing system of an aircraft, this flap including an aerodynamic skin that has a bird impact-sensitive frontal area, and a rear skin integral on the one hand with a trailing edge of an upper surface portion of the aerodynamic skin and on the other hand with a trailing edge of a lower surface portion of this skin, the flap also comprising a plurality of ribs spaced out along a leading edge longitudinal direction. According to the invention, the flap additionally includes, between two directly consecutive ribs, a single rigid bird trajectory-deflecting wall anchored on the one hand to the aerodynamic skin and on the other hand to the rear skin, this wall being able to deflect the trajectory of a bird subsequent to it impacting against the impact area. Furthermore, in a cross-section taken along any plane orthogonal to the leading edge longitudinal direction, the single rigid deflecting wall forms with a geometric chord of the flap an angle with a value of less than 45°.

To advantage and contrary to prior art embodiments, the effect sought and attained by the present invention is to limit the impact energy created during the collision between a bird and the leading edge mobile flap then transmitted to this same assembly, by providing an appropriate deflection of the trajectory of this bird. In other words, when a bird impacts against the mobile flap, the deflection implemented means that only a part of the kinetic energy relating to the bird which is transmitted to this mobile flap.

Consequently, the leading edge mobile flap is able to have a streamlined and lightened design relative to those encountered previously, while being capable of resisting any destructive effects that may be generated by a bird impacting on the frontal area. Thus, the flap according to the invention allows the disastrous consequences likely to result from such an impact to be averted.

Indeed, it is noted that in a first example where the aerodynamic skin is made out of a material that is not very ductile such as a composite material, when a bird impacts on the frontal area of the aerodynamic skin of the mobile flap, the bird cracks this frontal area and then perforates it locally. In this first example, the deterioration observed is such that the aerodynamic skin plays almost no part in absorbing the kinetic energy of the impact. However, immediately after the perforation of the frontal area, the bird comes into contact with the rigid wall which then deflects the trajectory of this bird. In this way, given that it is at a relatively small angle relative to the geometric chord, this deflecting wall then considerably restricts the impact energy, and therefore the dynamic loads transmitted to the mobile flap.

The aforementioned value of 45° in fact constitutes an upper limit beyond which a collision with a bird would generate impact energy too great for the rigid wall to be able to fulfill its deflection function without breaking, obviously in the event of this wall being of non-restricting thickness in terms of related weight.

It should therefore be understood that the arrangement proposed by the invention allows the impact energy transmitted to the structure to be reduced such that the rigid wall does not need to be over-dimensioned, or even combined with a cumbersome rigid ancillary structure of significant weight.

For information and as will be explained in a more detailed way hereinafter, when the flap is in a fully retracted position relative to a main central portion of the wing, the geometric chord of this flap is to be understood as being an imaginary line merged with a geometric chord of the wing which corresponds in a known way to the line segment connecting the point furthest forward of the fully retracted flap and the point furthest back of this main wing, in a cross-section of the wing taken along any plane orthogonal to the leading edge longitudinal direction.

In a second example where the aerodynamic skin is made out of a more ductile material such as a metal material, for example aluminium, the impact of a bird on the frontal area causes the latter to distort locally until it comes into contact with the rigid deflecting wall. In this way, the distortion of the aerodynamic skin allows a significant part of the kinetic impact energy to be absorbed. The residual energy is then dissipated in a way similar to that disclosed above in relation to the first example, namely by supporting the bird against the inclined rigid deflecting wall, this support causing the deflection of the trajectory of the bird. Naturally, in this second example, the bird is supported against the deflecting wall with the aerodynamic skin interposed between the two of them.

The two previous examples have been disclosed presupposing that the impact of the bird on the frontal area, encountered in cruise flight, on the ground during aircraft maneuvering operations or during the takeoff and landing phases, has a force that is significant enough to cause the aforementioned distortions. Nonetheless, for less forceful impacts that do not generate such distortions of the aerodynamic skin, for example when the aircraft is flying at low speed, aerodynamic load transmission obviously causes no problem, insofar as all the kinetic impact energy is absorbed by this aerodynamic skin, without the rigid deflecting wall needing to be acted upon mechanically.

Additionally, it is noted that the highly judicious anchoring of the single deflecting wall both to the aerodynamic skin, and to the rear skin, makes it possible to advantage to obtain a box-type structure between two directly consecutive ribs, merely by adding the aforementioned deflecting wall. Consequently, the flap is considerably strengthened by the presence of this box-type structure also formed using a part of the lower surface portion of the aerodynamic skin and the rear skin, but to advantage does not require the use of expensive means in terms of generated extra weight.

In a preferred way, in a cross-section taken along any plane orthogonal to the leading edge longitudinal direction, the rigid deflecting wall forms with the geometric chord of the flap an angle of between 25° and about 35°. Evaluations have in fact demonstrated that this range of value was optimum, in the sense that it allowed the trajectory of a bird to be deflected without this generating impact energy of too great a significance.

Preferentially, for each group of two directly consecutive ribs spaced out along the leading edge longitudinal direction, a single rigid bird trajectory-deflecting wall is provided between these two ribs. In this way, it is to advantage the whole of the leading edge mobile flap which is protected against birds impacting in the sensitive frontal area of the aerodynamic skin.

Preferably, a single rigid wall is anchored on the one hand to the lower surface portion of the aerodynamic skin and on the other hand to an upper part of the rear skin, so as to form a box-type structure using a part of the lower surface portion of the aerodynamic skin and of the rear skin, as has been mentioned above. Thus, the single rigid bird trajectory-deflecting wall is arranged so as to rise in a rearward direction.

Moreover, a cross-section of the box-type structure, taken along any plane orthogonal to the leading edge longitudinal direction, preferably has a shape that is substantially triangular.

In this respect, a single rigid bird trajectory-deflecting wall is preferably provided for each group of two directly consecutive ribs spaced out along the leading edge longitudinal direction, so as to form a plurality of box-type structures together constituting a beam extending along the leading edge longitudinal direction.

To advantage, this beam is therefore able to form the main element of the resistance to the loads produced when a bird impacts on the frontal area of the aerodynamic skin, and causes it to distort. On the other hand, after the impact with a bird, the beam has a flexural and a torsional strength that is considerably greater than that observed with prior art mobile flaps.

Another object of the invention is a main wing for the wing system of an aircraft that includes at least one leading edge mobile flap such as the one which has just been described.

Other advantages and characteristics of the invention will emerge in the non-restrictive detailed description given below.

BRIEF DESCRIPTION OF THE DRAWINGS

This description will be given in relation to the appended drawings among which:

FIG. 3 is a transverse cross-section view taken along the plane P in FIG. 2, this plane P being orthogonal to the leading edge longitudinal direction, and chosen in some way or other between two directly consecutive ribs.

DETAILED DESCRIPTION OF PREFERRED EMBODIMENTS

Figure 1:
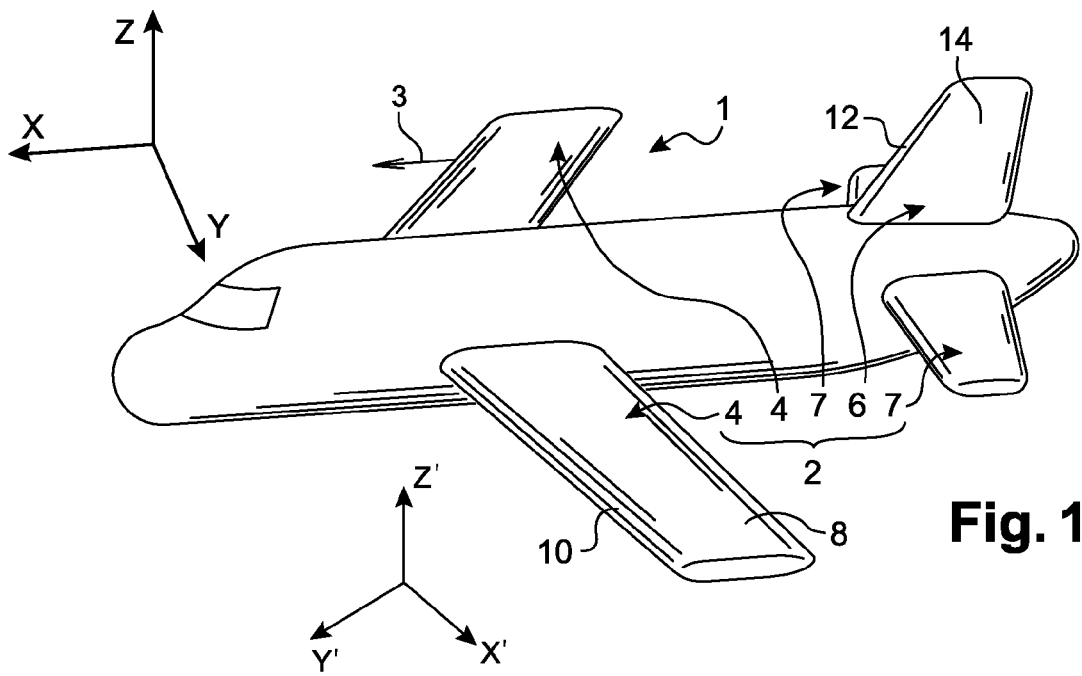
FIG. 1 shows a perspective view of an aircraft having main wings each able to be fitted with at least one leading edge mobile flap according to the invention.

With reference to FIG. 1, can be seen an aircraft 1 having a wing system 2 constituted by a plurality of wing system components, among which is included a vertical tail fin 6 and two horizontal tail units 7 located at the rear of this aircraft, and two main wings 4 each able to be fitted with at least one leading edge assembly according to the invention, as will be disclosed in detail below.

Throughout the following description, by convention, the longitudinal direction of the aircraft 1 is denoted X, the direction of transverse orientation relative to the aircraft is denoted Y, and the vertical direction is denoted Z, these three directions being orthogonal to each other.

On the other hand, the terms "front" and "rear" are to be considered relative to a forward-moving direction of the aircraft encountered subsequent to the thrust exerted by the aircraft engines, this direction being shown in diagrammatic form by the arrow 3.

As far as the main wings 4 are concerned, they each include a main central portion 8 constituting almost the whole of the wing, and being located to the rear of a leading edge 10, which may incorporate one or more mobile flaps (not shown in this FIG. 1). Here again, throughout the following description, by convention, the leading edge longitudinal direction is denoted X', the direction of transverse orientation relative to the leading edge 10 of the wing 4 Y', and the vertical direction Z', these three directions being orthogonal to each other. In the example shown in FIG. 1 given by way of example and wherein the aircraft has arrowed main wings, the directions X and Y' on the one hand and the directions X' and Y on the other hand are not parallel to each other, unlike the directions Z and Z'. Nonetheless, in an example such as this, the planes XY and X'Y' remain substantially parallel.

Thus, it is actually the leading edge 10 of each of the two main wings 4 which can be embodied using at least one leading edge mobile flap forming the subject matter of the present invention, and one preferred embodiment of which will now be described.

Figure 2:
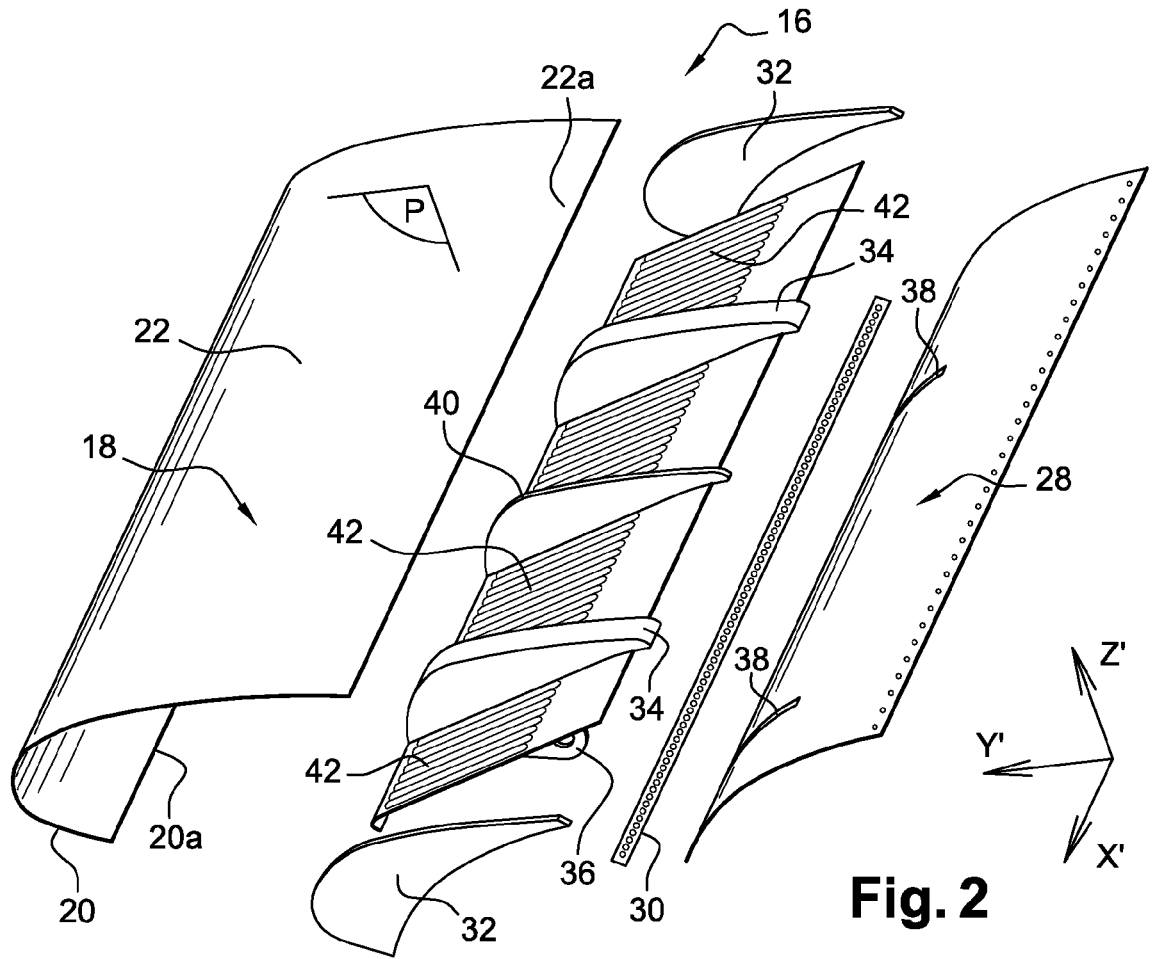
FIG. 2 shows a partially exploded perspective view of a leading edge mobile flap of a main wing of the wing system of an aircraft, according to a preferred embodiment of the present invention.

Referring jointly to FIGS. 2 and 3, a leading edge mobile flap 16 can be seen extending for example over substantially the entire length of the wing 4 concerned, obviously along the leading edge longitudinal direction X'. For obvious reasons of clarity in FIGS. 2 and 3, the main central portion 8 of the wing 4 has not been shown, but it can of course be implemented in any configuration known to the man skilled in the art.

The leading edge mobile flap 16 comprises an aerodynamic skin 18, possibly implemented using a number of anchored components and extending along the X', and defining a lower surface portion 20 and an upper surface portion 22. Moreover, as has been shown in FIG. 3, the skin 18 has a bird impact-sensitive frontal area 24, this area 24 being as described in the prior art. To be more precise but still for information, it being between a point A corresponding to the point furthest forward of the skin 18 in cruise phase when the flap 16 is fully retracted (as shown in this FIG. 3), and a point B corresponding to the point furthest forward of the skin 18 in the landing phase when the flap 16 is fully deployed.

Furthermore, it is noted that point A is located on a geometric chord 26 of the flap 16 which is merged with the geometric chord of the main wing 4, while point B is located on the upper surface portion 22.

It is noted that the "geometric chord 26" of the wing 4, and therefore of the flap 16, is to be understood as being the imaginary line segment connecting the point furthest forward and the point furthest back of the cross-section of the wing 4 when the flap is fully retracted as shown in FIG. 3, this section being taken along any plane orthogonal to the direction X'. In other words, the chord 26 is the straight segment connecting a point (the point A) forming the front junction between a lower surface and an upper surface of the wing and a point (not shown) forming the rear junction between these same lower and upper surfaces, still in any cross-section of the wing 4 taken along a plane Y'Z'.

A rear skin 28 of the flap 16 closes a rear part thereof. In fact, this rear skin 28 is integral on the one hand with a trailing edge 20a of the lower surface portion 20 of the skin 18, and on the other hand with a trailing edge 22a of the outer surface portion 22 of this same skin 18. It is pointed out that the rear skin 28, extending along the direction X', has in a known way a frontward curvature allowing it to conform in shape to a complimentary geometry part belonging to the main central portion of the wing 4, and to slide over it. Moreover, a spar 30 of L-shaped cross-section extending along the direction X' may be interposed between the trailing edge 20a of the lower surface portion 20 and a lower part of the skin 28, to strengthen the mechanical connection between these two components.

The skins 18 and 28, forming a space closed longitudinally along the direction X', are also anchored to two end ribs 32 closing on either side the above-mentioned space, using conventional means known to the man skilled in the art. Furthermore, the skins 18 and 28 are also anchored to load-introducing ribs 34. These load-introducing ribs 34 have in a lower part fastening means 36 allowing connection between the flap 16 and the displacement mechanisms thereof. Thus, orifices 38 are provided in the rear skin 28, so that the fastening means 36 are able to pass through it.

On the other hand, the skins 18 and 28 may also be anchored to one or more intermediate ribs 40, these in fact being able to be interposed between any two directly consecutive ribs 32, 34, for the purpose of increasing the rigidity of the flap 16.

In the light of what has been said before, it can be seen that the leading edge mobile flap 16 according to the first preferred embodiment of the present invention comprises a plurality of ribs 32, 34 and 40, commonly denoted transverse ribs of the mobile flap. They are spaced out along the direction X', and preferably all of vertical orientation, along the direction Y' of the leading edge 10.

The particularity of the invention lies in the fact that between any two directly consecutive ribs 32, 34 and 40, the mobile flap 16 includes a single rigid bird trajectory-deflecting wall 42 anchored between these two same ribs, and possibly also anchored to the two of them. As indicated previously, the rigid deflecting wall 42 acts to deflect the trajectory of a bird subsequent to the latter impacting against the impact area 24, when this impact leads to a distortion of the skin 18 and to the bird being supported against the rigid wall 42.

As can best be seen in FIG. 3, the rigid wall 42 has a front lower edge 43 slightly curved inwards to the flap, and anchored to the lower surface portion 20 of the skin 18, for example by being riveted or bolted. This wall 42 which is substantially plane and preferentially parallel to the direction X' extends backwards rising up to an upper rear edge 45, and comes preferably to be at a tangent to an upper part of the rear skin 28. Thus, the rear upper edge 45 is therefore anchored to the rear skin 28, for example by being riveted or bolted, in proximity to the trailing edge 22*a* of the upper surface portion 22.

In this respect, in any cross-section taken along a plane Y'Z' between any two directly consecutive ribs 32, 34, 40, an angle $\alpha 1$ formed between the rigid wall 42 and the geometric chord 26 is below 45°, and preferably about 30° as has been shown in FIG. 3.

With an arrangement of this kind, the deflecting wall 42 forms with the lower surface portion 20 and the skin 28 a box-type structure 44, which in a cross-section taken along any plane orthogonal to the direction X', is preferably substantially triangular in shape. Moreover, it is clearly obvious that when a deflecting wall 42 is provided for each group of two directly consecutive ribs 32, 34 and 40 of the flap 16, the successively placed box-type structures 44 then constitute together a single beam (not identified by a reference number) extending along the direction X', over the entire length of the flap 16. Thus, this beam of triangular cross-section confers excellent flexural and torsional strength characteristics, and is therefore implemented using a part of the lower surface portion 20, of the skin 28, and using the rigid deflecting walls 42.

All the constituent components of the leading edge mobile flap 16, except for the rigid deflecting walls 42, are for example made using a material that is not very ductile, such as a composite material. In such an example, the rigid walls 42 following each other along the direction X' may then be made out of a metal material such as aluminium or alloys thereof. The choices of materials which have just been indicated then to advantage make it possible to offer a completely satisfactory compromise between the mechanical strength and the weight of the mobile flap 16.

Clearly, different modifications may be made by the man skilled in the art to the leading edge mobile flap 16 which has just been described, purely as a non-restrictive example.

The invention claimed is:

1. Leading edge mobile flap (16) for a main wing (4) of the wing system of an aircraft (1), said flap including an aerodynamic skin (18) that has a bird impact-sensitive frontal area (24), and a rear skin (28) extending between and intergral with a trailing edge (22*a*) of an upper surface portion (22) of the aerodynamic skin (18) and with a trailing edge (20*a*) of a lower surface portion (20) of this skin (18), said flap also comprising a plurality of ribs (32, 34, 40) spaced out along a leading edge longitudinal direction (X'), characterised in that the flap additionally includes, between two directly consecutive ribs, a single rigid bird trajectory-deflecting wall (42) anchored to the aerodynamic skin (18) and to the rear skin (28), this wall (42) being capable of deflecting the trajectory of a bird subsequent to it impacting against said impact area (24), and in that in a cross-section taken along any plane orthogonal to the leading edge longitudinal direction (X'), said rigid deflecting wall (42) forms with a geometric chord (26) of the flap an angle ($\alpha 1$) with a value of less than 45°.

2. Leading edge mobile flap (16) according to claim 1, characterised in that in a cross-section taken along any plane orthogonal to the leading edge longitudinal direction (X'), said rigid deflecting wall (42) forms with the geometric chord (26) an angle (alpha 1) of between about 25 degree and about 35 degree.

3. Leading edge mobile flap (16) according to claim 1, characterised in that for each group of two directly consecutive ribs (32,34,40) spaced out along the leading edge longitudinal direction (X'), a single rigid bird trajectory-deflecting wall (42) is provided between said two ribs.

4. Leading edge mobile flap (16) according to claim 1, characterised in that said single rigid wall (42) is anchored to said lower surface portion (20) of the aerodynamic skin (18) and to an upper part of the rear skin (28), so as to form a box-type structure (44) using a part of the lower surface portion (20) of the aerodynamic skin (18) and of the rear skin (28), such that said single rigid bird trajectory-deflecting wall (42) is arranged so as to rise in a rearward direction.

5. Leading edge mobile flap (16) according to claim 4, characterised in that a cross-section of the said box-type structure (44), taken along any plane orthogonal to the leading edge longitudinal direction (X'), is substantially triangular in shape.

6. Leading edge mobile flap (16) according to claim 4, characterised in that a single rigid bird trajectory-deflecting wall (42) is provided for each group of two directly consecutive ribs (32, 34, 40) spaced out along the leading edge longitudinal direction (X'), so as to form a plurality of box-type structures (44) together constituting a beam extending along the leading edge longitudinal direction (X').

7. Leading edge mobile flap (16) according to claim 1, characterised in that the aerodynamic skin (18) is made using a material that is not very ductile.

8. Main wing (4) of the wing system of an aircraft (1), characterised in that it includes at least one leading edge mobile flap (16) according to claim 1.

* * * * *